(12) United States Patent
Tseng

(10) Patent No.: US 9,507,106 B2
(45) Date of Patent: Nov. 29, 2016

(54) OPTICAL COMMUNICATION DEVICE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 634 days.

(21) Appl. No.: 14/035,961

(22) Filed: Sep. 25, 2013

(65) Prior Publication Data

US 2016/0216462 A1   Jul. 28, 2016

(30) Foreign Application Priority Data

Apr. 3, 2013  (TW) .............................. 102112078 A

(51) Int. Cl.
*G02B 6/42* (2006.01)
*G02B 6/12* (2006.01)
*G02B 6/32* (2006.01)

(52) U.S. Cl.
CPC ........... *G02B 6/424* (2013.01); *G02B 6/12004* (2013.01); *G02B 6/32* (2013.01); *G02B 6/423* (2013.01); *G02B 6/4206* (2013.01); *G02B 6/4245* (2013.01); *G02B 6/4274* (2013.01); *G02B 6/4295* (2013.01)

(58) Field of Classification Search
None
See application file for complete search history.

(56) References Cited

U.S. PATENT DOCUMENTS

2009/0028497 A1 *  1/2009  Kodama ................. G02B 6/43
385/14

FOREIGN PATENT DOCUMENTS

| JP | 2001188150 A | * | 7/2001 |
| JP | 2004325636 A | * | 11/2004 |
| JP | 2007334343 A | * | 12/2007 |

* cited by examiner

*Primary Examiner* — Hemang Sanghavi
(74) *Attorney, Agent, or Firm* — Zhigang Ma

(57) ABSTRACT

An optical communication device includes a planar optical waveguide, a substrate, a light emitting element, a light receiving element, a first optical waveguide, and a second optical waveguide. The substrate is supported over the planar optical waveguide. The light emitting element and the light receiving element are electrically connected to the substrate. The planar optical waveguide defines a first guide hole and a second guide hole. The substrate defines a first receiving hole and a second receiving hole. The first optical waveguide includes a first sloped surface and is received in the first guide hole and the first receiving hole, such that the first sloped surface aligns with the light emitting element. The second optical waveguide includes a second sloped surface and is received in the second guide hole and the second receiving hole, such that the second sloped surface aligns with the light emitting element.

10 Claims, 1 Drawing Sheet

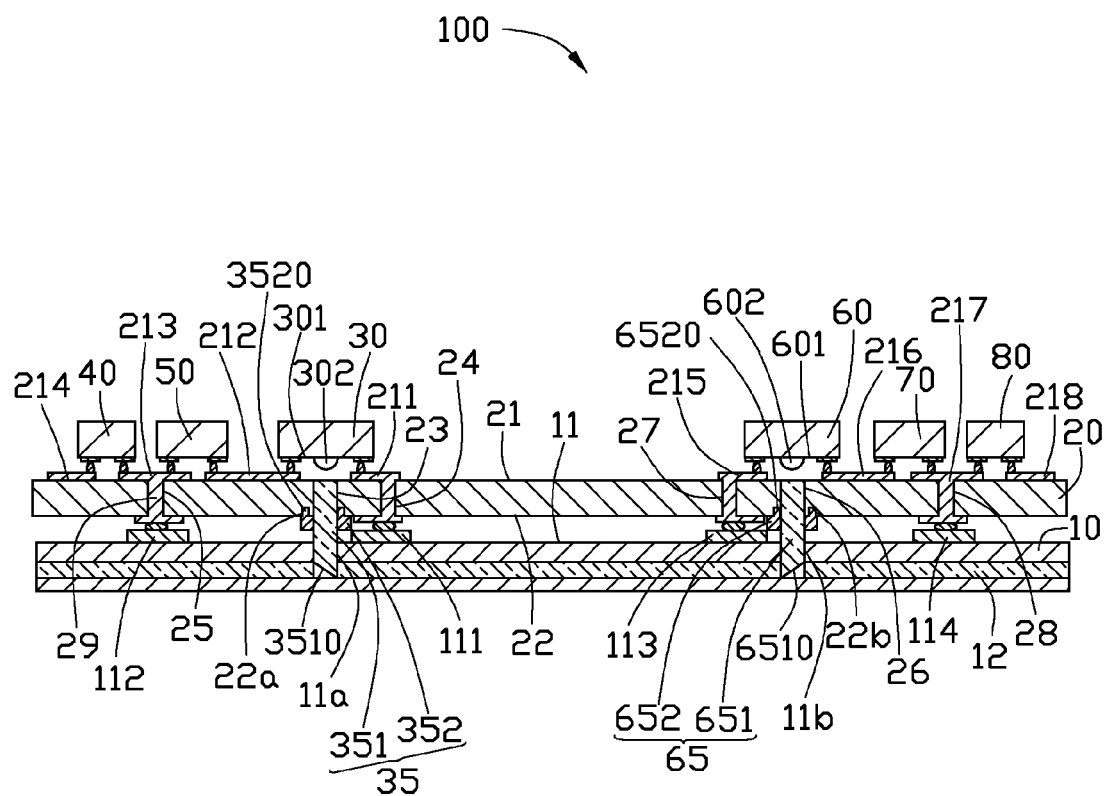

OPTICAL COMMUNICATION DEVICE

BACKGROUND

1. Technical Field

The present disclosure relates to an optical communication device.

2. Description of Related Art

Optical communication devices include a photoelectric element for emitting/receiving optical signals, a driver chip for driving the photoelectric element, a planar light waveguide for transmitting optical signals, and a lens element for optically coupling the photoelectric element to the light waveguide. To ensure an optical transmission efficiency of the optical communication device, the photoelectric element and the light waveguide need to be accurately aligned with the lens element. However, a complicated alignment mechanism and method is needed to align the photoelectric element and the light waveguide with the lens element, which increases a cost and assembling difficulty of the optical communication device.

Therefore, it is desirable to provide an optical communication device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a planar optical waveguide 10, a substrate 20, a light emitting element 30, a first controller 40, a processor 50, a light receiving element 60, a second controller 70, and a storing element 80.

The planar optical waveguide 10 includes a top surface 11 and a light guide portion 12 formed in the planar optical waveguide 10. The planar optical waveguide 10 defines a first guide hole 11a and a second guide hole 11b. Both the first guide hole 11a and the second guide hole 11b pass though the top surface 11 and the light guide portion 12.

The planar optical waveguide 10 includes a first connection pad 111, a second connection pad 112, a third connection pad 113, and a fourth connection pad 114. The first guide hole 11a is located between the first connection pad 111 and the second connection pad 112. The second guide hole 11b is located between the third connection pad 113 and the fourth connection pad 114.

The substrate 20 can be made of a material such as polyimide, ceramic, or glass fiber, for example. The substrate 20 includes a mounting surface 21 and a bottom surface 22 facing away from the mounting surface 21. The bottom surface 22 is supported over the top surface 11.

The mounting surface 21 defines a first receiving hole 23, a first through hole 24, and a second through hole 25. The first receiving hole 23, the first through hole 24, and the second through hole 25 all run through the mounting surface 21 and the bottom surface 22. The first receiving hole 23 is located between the first through hole 24 and the second through hole 25. The mounting surface 21 further defines a second receiving hole 26, a third through hole 27, and a fourth through hole 28. The second receiving hole 26, the third through hole 27, and the fourth through hole 28 all run through the mounting surface 21 and the bottom surface 22. The second receiving hole 23 is located between the third through hole 27 and the fourth through hole 28. The first through hole 24, the second through hole 25, the third through hole 27, and the fourth through hole 28 are all filled with a conductive element 29.

The substrate 20 includes a fifth connection pad 211, a sixth connection pad 212, a seventh connection pad 213, an eighth connection pad 214, a ninth connection pad 215, a tenth connection pad 216, an eleventh connection pad 217, and a twelfth connection pad 218.

One end of the conductive element 29 received in the first through hole 24 is electrically connected to the first connection pad 111, while the other end of the conductive element 29 received in the first through hole 24 is electrically connected to the fifth connection pad 211. One end of the conductive element 29 received in the second through hole 25 is electrically connected to the second connection pad 112, while the other end of the conductive element 29 received in the second through hole 25 is electrically connected to the seventh connection pad 213. One end of the conductive element 29 received in the third through hole 27 is electrically connected to the third connection pad 113, while the other end of the conductive element 29 received in the third through hole 27 is electrically connected to the ninth connection pad 215. One end of the conductive element 29 received in the fourth through hole 28 is electrically connected to the fourth connection pad 114, while the other end of the conductive element 29 received in the fourth through hole 28 is electrically connected to the eleventh connection pad 217.

The bottom surface 22 of the substrate 20 defines two first locating holes 22a and two second locating holes 22b. The first locating holes 22a are substantially symmetrical about the first receiving hole 23. The second locating holes 22b are substantially symmetrical about the second receiving hole 26.

The optical communication device 100 further comprises a first guiding assembly 35 and a second guiding assembly 65. The first guiding assembly 35 includes a first optical waveguide 351 and a first fixing ring 352. The first optical waveguide 351 includes a first sloped surface 3510. The first fixing ring 352 includes two first locating posts 3520 spatially corresponding to the two first locating holes 22a. In assembly, the first optical waveguide 351 runs through the first fixing ring 352, and each first locating post 3520 is received by a first locating hole 22a to assemble the first fixing ring 352 to the substrate 20. Therefore, the first optical waveguide 351 is fixed to the substrate 20 and is received in the first guide hole 11a and the first receiving hole 23.

The second guiding assembly 65 includes a second optical waveguide 651 and a second fixing ring 652. The second optical waveguide 651 includes a second sloped surface 6510. The second fixing ring 652 includes two second locating posts 6520 spatially corresponding to the two second locating holes 22b. In assembly, the second optical waveguide 651 runs through the second fixing ring 652, and each second locating post 6520 is received by a second locating hole 22b to assemble the second fixing ring 652 to the substrate 20. Therefore, the second optical waveguide 651 is fixed to the substrate 20 and is received in the second guide hole 11b and the second receiving hole 26.

The light emitting element 30 includes a light emitting surface 301 and a first light condensing lens 302 formed on the light emitting surface 301. In the embodiment, the light emitting element 30 is a laser diode and is electrically connected to the fifth connection pad 211 and the sixth connection pad 212 through a flip chip method. The light emitting surface 301 faces the first optical waveguide 351. The light emitting surface 301 faces the first sloped surface 3510 at about a 45 degree angle. The first light condensing lens 302 is a convex lens. In the embodiment, an included angle between an optical axis of the first light condensing lens 302 and the first sloped surface 3510 is about 45 degrees.

The first controller 40 is electrically connected to the seventh connection pad 213 and the eighth connection pad 214 through a flip chip method. The processor 50 is located between the light emitting element 30 and the first controller 40. In particular, the processor 50 is electrically connected to the sixth connection pad 212 and the seventh connection pad 213 through a flip chip method. As such, the processor 50 is electrically connected to the first controller 40 and the light emitting element 30.

The light receiving element 60 includes a light receiving surface 601 and a second light condensing lens 602 formed on the light receiving surface 601. In the embodiment, the light receiving element 60 is a photo diode and is electrically connected to the ninth connection pad 215 and the tenth connection pad 216 through a flip chip method. The light receiving surface 601 faces the second sloped surface 6510 at about a 45 degree angle. The second light condensing lens 602 is a convex lens. In the embodiment, an included angle between an optical axis of the second light condensing lens 602 and the second sloped surface 6510 is about 45 degrees.

The storing element 80 is electrically connected to the eleventh connection pad 217 and the twelfth connection pad 218 through a flip chip method. The second controller 70 is located between the light receiving element 60 and the storing element 80, and is electrically connected to the tenth connection pad 216 and the eleventh connection pad 217 through a flip chip method. In the embodiment, the storing element 80 is a flash memory.

In use, the processor 50 sends a trigger signal to the first controller 40. The first controller 40 receives the trigger signal and generates a driving signal to drive the light emitting element 30 to emit light beams. The light beams emitted by the light emitting element 30 are condensed by the light condensing lens 302 and are directed onto the first sloped surface 3510 of the first optical waveguide 351. The first sloped surface 3510 bends the light beams about 90 degrees, so that the light beams enter into the light guide portion 12 of the planar optical waveguide 10. The light reflects off the second sloped surface 6510 and is bent about 90 degrees onto the second light condensing lens 602. The light receiving element 60 converts light signals received by the second light condensing lens 602 into electrical signals, and transmits the electrical signals to the second controller 70. The second controller 70 amplifies the electrical signals. The storing element 80 stores the amplified electrical signals.

In other embodiments, both the first light condensing lens 302 and the second light condensing lens 602 can be omitted if the light is not required to be condensed.

In other embodiments, the first fixing ring 352 can be omitted if the first optical waveguide 351 is fixedly received in the first guide hole 11a and the first receiving hole 23 by an adhesive. The second fixing ring 652 can be omitted if the second optical waveguide 651 is fixedly received in the second guide hole 11b and the second receiving hole 26 by an adhesive.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical communication device, comprising:
    a planar optical waveguide, the planar optical waveguide defining a first guide hole and a second guide hole;
    a substrate supported on the planar optical waveguide, and defining a first receiving hole and a second receiving hole, the first receiving hole spatially corresponding the first guide hole, and the second receiving hole spatially corresponding the second guide hole;
    a light emitting element supported on and electrically connected to the substrate, the light emitting element comprising a light emitting surface;
    a light receiving element supported on and electrically connected to the substrate, the light receiving element comprising a light receiving surface;
    a first guiding assembly comprising a first optical waveguide, the first optical waveguide comprising a first sloped surface, the first optical waveguide received in the first guide hole and the first receiving hole, with the first sloped surface aligning with the light emitting surface;
    a second guiding assembly comprising a second optical waveguide, the second optical waveguide comprising a second sloped surface, the second optical waveguide received in the second guide hole and the second receiving hole, with the second sloped surface aligning with the light receiving surface;
    a first controller;
    a processor;
    a second controller; and
    a storing element;
    wherein the planar optical waveguide comprises a top surface and a light guide portion formed on the planar optical waveguide, the substrate supported on the top surface, both the first guide hole and the second guide hole pass though the top surface and the light guide portion;
    wherein the substrate comprises a mounting surface and a bottom surface facing away from the mounting surface, the bottom surface is supported over the top surface, both the first controller and the processor are supported on the mounting surface, the first controller is electrically connected to the processor and the light emitting element;
    wherein both the second controller and the storing element are supported on the mounting surface, the second controller is electrically connected to the storing element and the light receiving element; and
    wherein the planar optical waveguide comprises a first connection pad, a second connection pad, a third connection pad, and a fourth connection pad, the mounting surface defines a first through hole, the first receiving hole, a second through hole, the second receiving hole, a third through hole, and a fourth through hole, all of the first receiving hole, the first through hole, the second through hole, the second receiving hole, the third through hole, and the fourth through hole run through the mounting surface and the bottom surface, each of the first through hole, the second through hole, the third through hole, and the fourth through hole is filled with a conductive element, the substrate comprises a fifth connection pad, a sixth connection pad, a seventh connection pad, and an eighth connection pad, a ninth connection pad, a tenth connection pad, an eleventh connection pad, and a twelfth connection pad, one end of the conductive element received in the first through hole is electrically connected to the first connection pad, the other end of the conductive element received in the first through hole is electrically connected to the fifth connection pad, one end of the conductive element received in the second through hole is electrically connected to the second connection pad, the other end of the conductive element received in the second through hole is electrically connected to the seventh connection pad, one end of the conductive element received in the third through hole is electrically connected to the third connection pad, the other end of the conductive element received in the third through hole is electrically connected to the ninth connection pad, one end of the conductive element received in the fourth through hole is electrically connected to the fourth connection pad, the other end of the conductive element received in the fourth through hole is electrically connected to the eleventh connection pad.

2. The optical communication device of claim 1, wherein the light emitting element is electrically connected to the fifth connection pad and the sixth connection pad, the first controller is electrically connected to the seventh connection pad and the eighth connection, the processor is electrically connected to the sixth connection pad and the seventh connection pad.

3. The optical communication device of claim 1, wherein the light receiving element is electrically connected to the ninth connection pad and the tenth connection pad, the second controller is electrically connected to the tenth connection pad and the eleventh connection pad, the storing element is electrically connected to the eleventh connection pad and the twelfth connection pad.

4. The optical communication device of claim 1, wherein the storing element is a flash memory.

5. The optical communication device of claim 1, wherein the bottom surface of the substrate defines two first locating holes and two second locating holes, the first guiding assembly comprises a first fixing ring, the first fixing ring comprises two first locating posts spatially corresponding to the two first locating holes, the first optical waveguide runs through the first fixing ring, each first locating post is inserted into a respective one of the first locating holes to assemble the first fixing ring onto the substrate, to fix the first optical waveguide to the substrate.

6. The optical communication device of claim 1, wherein the second guiding assembly comprises a second fixing ring, the second fixing ring comprises two second locating posts spatially corresponding to the two second locating holes, the second optical waveguide runs through the second fixing ring, each second locating post is inserted into a respective one of the second locating holes to assemble the second fixing ring onto the substrate, to fix the second optical waveguide to the substrate.

7. The optical communication device of claim 1, wherein the light emitting element comprises a first light condensing lens formed on the light emitting surface, an included angle between an optical axis of the first light condensing lens and the first sloped surface is about 45 degrees.

8. The optical communication device of claim 1, wherein the light receiving element comprises a second light condensing lens formed on the light receiving surface, an included angle between an optical axis of the second light condensing lens and the second sloped surface is about 45 degrees.

9. The optical communication device of claim 1, wherein the light emitting element is a laser diode, the light receiving element is a photo diode.

10. An optical communication device, comprising:
   a planar optical waveguide, the planar optical waveguide defining a first guide hole and a second guide hole;
   a substrate supported on the planar optical waveguide, and comprising a mounting surface and a bottom surface facing away from the mounting surface, the mounting surface defining a first through hole, a first receiving hole, a second through hole, a second receiving hole, a third through hole, and a fourth through hole, the first receiving hole spatially corresponding the first guide hole, the second receiving hole spatially corresponding the second guide hole, all of the first receiving hole, the first through hole, the second through hole, the second receiving hole, the third through hole, and the fourth through hole running through the mounting surface and the bottom surface, each of the first through hole, the second through hole, the third through hole, and the fourth through hole being filled with a conductive element;
   a light emitting element supported on and electrically connected to the substrate, the light emitting element comprising a light emitting surface;
   a light receiving element supported on and electrically connected to the substrate, the light receiving element comprising a light receiving surface;
   a first guiding assembly comprising a first optical waveguide, the first optical waveguide comprising a first sloped surface, the first optical waveguide received in the first guide hole and the first receiving hole, with the first sloped surface aligning with the light emitting surface;
   a second guiding assembly comprising a second optical waveguide, the second optical waveguide comprising a second sloped surface, the second optical waveguide received in the second guide hole and the second receiving hole, with the second sloped surface aligning with the light receiving surface;
   wherein the substrate comprises a mounting surface and a bottom surface facing away from the mounting surface,
   wherein the planar optical waveguide comprises a first connection pad, a second connection pad, a third connection pad, and a fourth connection pad, the substrate further comprises a fifth connection pad, a sixth connection pad, a seventh connection pad, and an eighth connection pad, a ninth connection pad, a tenth connection pad, an eleventh connection pad, and a twelfth connection pad, one end of the conductive element received in the first through hole is electrically connected to the first connection pad, the other end of the conductive element received in the first through hole is electrically connected to the fifth connection pad, one end of the conductive element received in the second through hole is electrically connected to the second connection pad, the other end of the conductive element received in the second through hole is electrically connected to the seventh connection pad, one end of the conductive element received in the third through hole is electrically connected to the third connection pad, the other end of the conductive element received in the third through hole is electrically connected to the ninth connection pad, one end of the conductive element received in the fourth through hole is electrically connected to the fourth connection pad, the other end of the conductive element received in the fourth through hole is electrically connected to the eleventh connection pad.

* * * * *